United States Patent
DeLuca et al.

(10) Patent No.: US 9,100,373 B2
(45) Date of Patent: *Aug. 4, 2015

(54) SYSTEM AND METHOD FOR TEMPORARY OBFUSCATION DURING COLLABORATIVE COMMUNICATIONS

(71) Applicant: International Business Machines Corporation, Armonk, NY (US)

(72) Inventors: Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,611

(22) Filed: Sep. 5, 2013

(65) Prior Publication Data

US 2014/0208445 A1    Jul. 24, 2014

Related U.S. Application Data

(63) Continuation of application No. 13/747,879, filed on Jan. 23, 2013.

(51) Int. Cl.
   *G06F 17/30*     (2006.01)
   *H04L 29/06*     (2006.01)
   *H04W 4/12*      (2009.01)
   *H04W 12/02*     (2009.01)

(52) U.S. Cl.
   CPC ............ *H04L 63/0428* (2013.01); *H04W 4/12* (2013.01); *H04W 12/02* (2013.01)

(58) Field of Classification Search
   CPC ..... H04W 4/12; H04W 12/02; H04L 63/0428
   USPC ........................................ 726/26, 30
   See application file for complete search history.

(56) References Cited

U.S. PATENT DOCUMENTS

| | | |
|---|---|---|
| 8,519,971 B1 | 8/2013 | Mackraz |
| 8,706,817 B2 | 4/2014 | Daniels et al. |
| 2004/0201624 A1* | 10/2004 | Crawford ...................... 345/751 |
| 2005/0138110 A1 | 6/2005 | Redlich et al. |
| 2005/0259845 A1* | 11/2005 | Dehlin et al. .................. 382/103 |
| 2007/0061889 A1 | 3/2007 | Sainaney |
| 2007/0150340 A1* | 6/2007 | Cartmell ......................... 705/14 |
| 2009/0132419 A1* | 5/2009 | Grammer et al. ............... 705/50 |
| 2009/0144829 A1* | 6/2009 | Grigsby et al. ................. 726/26 |
| 2009/0147958 A1 | 6/2009 | Calcaterra et al. |

(Continued)

OTHER PUBLICATIONS

Chakraborty et al, Pervasive Enablement of Business Processes, IEEE, 2004, pp. 1-11.*

(Continued)

*Primary Examiner* — Luu Pham
*Assistant Examiner* — Jenise Jackson
(74) *Attorney, Agent, or Firm* — Jeff Tang; Ryan, Mason & Lewis, LLP

(57) ABSTRACT

Systems and methods for temporary obfuscation during collaborative communications are provided. A method for obfuscation during collaborative communications, comprises entering a message including content into a first messaging device, marking the content as sensitive, sending the message including the content via a network to a second messaging device, and obfuscating the marked content and displaying any remaining portions of the message on the second messaging device.

11 Claims, 6 Drawing Sheets

(56) References Cited

U.S. PATENT DOCUMENTS

| | | | |
|---|---|---|---|
| 2009/0259588 A1 | 10/2009 | Lindsay | |
| 2009/0300774 A1 | 12/2009 | Makkinejad | |
| 2010/0146583 A1* | 6/2010 | Prehofer et al. | 726/1 |
| 2010/0325221 A1* | 12/2010 | Cohen et al. | 709/206 |
| 2011/0154040 A1 | 6/2011 | Bheemanna | |
| 2011/0206285 A1* | 8/2011 | Hodge et al. | 382/224 |
| 2012/0092365 A1* | 4/2012 | Jung et al. | 345/619 |
| 2012/0192248 A1* | 7/2012 | Kocjan et al. | 726/1 |
| 2012/0246739 A1* | 9/2012 | Mebed | 726/28 |
| 2012/0296954 A1* | 11/2012 | Lyle et al. | 709/202 |
| 2012/0326971 A1 | 12/2012 | Zhou | |
| 2013/0080275 A1* | 3/2013 | Ronca et al. | 705/21 |
| 2013/0132862 A1* | 5/2013 | Noel et al. | 715/753 |
| 2013/0185363 A1* | 7/2013 | DeLuca et al. | 709/206 |
| 2013/0307870 A1 | 11/2013 | Ashbrook | |
| 2014/0013451 A1* | 1/2014 | Kulka et al. | 726/29 |
| 2014/0344383 A1* | 11/2014 | Odell et al. | 709/206 |

OTHER PUBLICATIONS

Tat et al, CrystalChat: Visualizing Personal Chat History, Proceedings of the 39th Hawaii International Conference on System Sciences, 2006, pp. 1-10.*

T-V. Tung et al., "Pandora Messaging: An Enhanced Self-Message-Destructing Secure Instant Messaging Architecture for Mobile Devices," IEEE, 2012, pp. 720-725.

J. Yao et al., "Privacy Preserving DRM Solution with Content Classification and Superdistribution," IEEE, 2009, pp. 1-5.

Hawkey et al, PrivateBits: Managing Visual Privacy in Web Browsers, Graphics Interface, May 30, 2007, pp. 215-223.

Raento et al, Designing for Privacy and Self-Presentation in Social Awarness, Springer-Verlag London, Apr. 11, 2008, pp. 527-548.

* cited by examiner

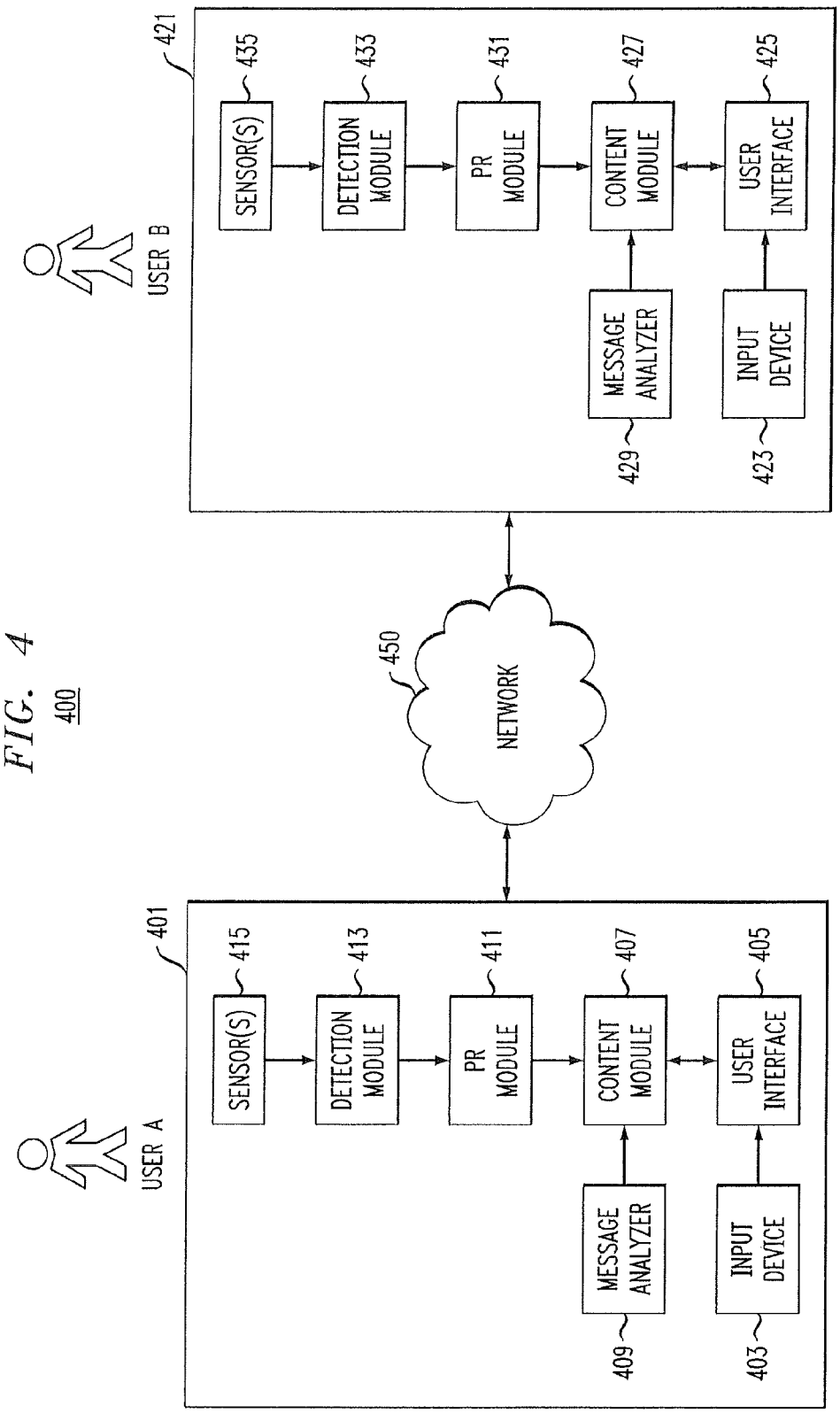

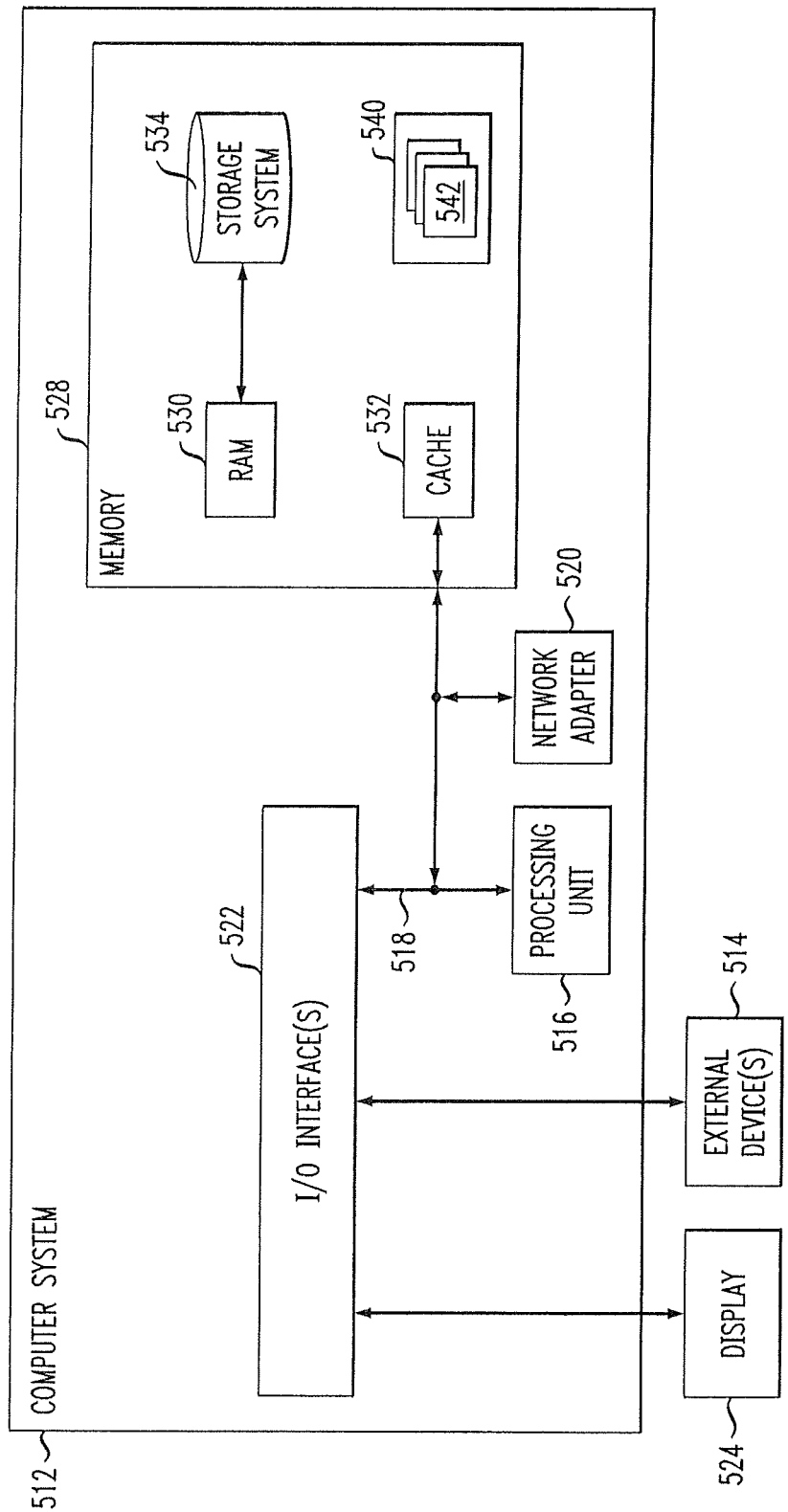

SYSTEM AND METHOD FOR TEMPORARY OBFUSCATION DURING COLLABORATIVE COMMUNICATIONS

CROSS-REFERENCE TO RELATED APPLICATION

This application is a Continuation of U.S. application Ser. No. 13/747,879, filed on Jan. 23, 2013, the disclosure of which is incorporated herein in its entirety by reference.

TECHNICAL FIELD

The field generally relates to systems and methods for obfuscation during communications and, in particular, to systems and methods for temporary obfuscation during collaborative communications.

BACKGROUND

Sometimes during an electronic communication, such as an instant messaging or email conversation, a section of text or media in the communication may be inappropriate for certain audiences. If the recipient or sender wishes to alert the other party to the communication of, or otherwise hide the content, there are presently no effective means for accomplishing this task. As a result, a user is typically resigned to closing a chat window or message thread, and/or deleting the history of the communication including the potentially inappropriate subject matter.

Some known methods for addressing sensitive information relate to allowing a user to unobscure selected pages of an online document upon receipt of authentication information, but do not relate to obscuring an entire or part of a message in a collaborative communication, such as an instant message, or a message sent via, for example, a smartphone, using short message service (SMS) or multimedia messaging service (MMS). Other known methods relate to encryption and decryption, where users can encrypt messages, and a receiver identified as an authorized user can decrypt and read the messages.

None of the known methods for obfuscating electronic content provide a temporary obfuscating method for collaborative communications, which can inform recipients of the sensitivity of the content, while still allowing the recipients to easily lock, unlock and view the sensitive content.

SUMMARY

In general, exemplary embodiments of the invention include systems and methods for obfuscation during communications and, in particular, to systems and methods for temporary obfuscation during collaborative communications.

According to an exemplary embodiment of the present invention, a system for obfuscation during collaborative communications comprises a first messaging device and a second messaging device connected to each other via a network, wherein the first and second messaging devices each include a user interface and an input device through which a user of the messaging device is able to instruct the system to mark content of a message as sensitive, and a content module capable of marking the content of the message as sensitive, and obfuscating the marked content, wherein the marked content is obfuscated on the messaging device which receives the message.

The first and second messaging devices can each include at least one of a desktop computer, laptop, mobile phone, or a personal digital assistant (PDA).

The network can be at least one of a local area network (LAN), wide area network (WAN), cellular network, satellite network or the Internet.

The first and second messaging devices can each include a message analyzer module connected to the content module, wherein the message analyzer module is capable of analyzing the message to determine the presence of at least one of a graphic, meta data, a keyword or a key phrase. If the message analyzer module finds at least one of the graphic, meta data, keyword or key phrase, the message analyzer module outputs the finding to the content module, wherein the content module is capable of applying a flag to mark a part of the message corresponding to the at least one of the graphic, meta data, keyword or key phrase as sensitive.

The first and second messaging devices can each include a preference rules module which is capable of outputting to the content module one or more predetermined preference rules that instruct that the message or a part of the message be marked as sensitive. The predetermined preference rules can be based on at least one of location, time, or people in proximity to the messaging devices. The first and second messaging devices can each include a detection module capable of determining at least one of a presence of a device in proximity to, a presence of a person in proximity to, or a location of each of the first and second messaging devices. The detection module can be connected to one or more biometric sensors.

The content module can be capable of marking as sensitive and obfuscating the message or the part of the message based on the predetermined preference rules.

Prior to obfuscation of the marked content on the messaging device which receives the message, the preference rule module can perform a check to determine whether any preference rules have been implemented which may put conditions on whether the marked content is obfuscated.

A user of the messaging device which received the message can instruct the system to reveal the obfuscated content via the user interface and the input device.

A user of the messaging device from which the message is sent can provide details about the marked content via the input device, and wherein the details are transmitted via the network to a user of the messaging device which receives the message. The details can include at least one of why, where or when the marked content is sensitive.

The content module can obfuscate the marked content by concealing the marked content while displaying an image indicating that the marked content has been obfuscated.

The marked content can remain visible or be obfuscated on the messaging device from which the message is sent.

According to an exemplary embodiment of the present invention, a method for obfuscation during collaborative communications, comprises entering a message including content into a first messaging device, marking the content as sensitive, sending the message including the content via a network to a second messaging device, and obfuscating the marked content and displaying any remaining portions of the message on the second messaging device.

The content can be marked as sensitive on the first messaging device and/or the second messaging device.

The method may further comprise analyzing the message to determine the presence of at least one of a graphic, meta data, a keyword or a key phrase, and applying a flag to mark a part of the message corresponding to the at least one of the graphic, meta data, keyword or key phrase as sensitive.

The method may further comprise applying one or more predetermined preference rules that instruct that the message or a part of the message be marked as sensitive.

The method may further comprise determining at least one of a presence of a device in proximity to, a presence of a person in proximity to, or a location of each of the first and second messaging devices.

The method may further comprise marking as sensitive and obfuscating the message or the part of the message based on the predetermined preference rules.

The method may further comprise, prior to obfuscation of the marked content on the second messaging device, determining whether any preference rules have been implemented which may put conditions on whether the marked content is obfuscated.

The method may further comprise revealing the obfuscated content via a user interface and an input device on the second messaging device.

The method may further comprise providing details about the marked content, and transmitting the details via the network to the second messaging device.

The details can include at least one of why, where or when the marked content is sensitive.

Obfuscating the marked content may comprise concealing the marked content while displaying an image indicating that the marked content has been obfuscated.

Marking the content as sensitive may comprise highlighting the content, and/or tagging all or part of the content with meta data.

According to an exemplary embodiment of the present invention, an article of manufacture may comprise a computer readable storage medium comprising program code tangibly embodied thereon, which when executed by a computer, performs method steps for obfuscation during collaborative communications, the method steps comprising entering a message including content into a first messaging device, marking the content as sensitive, sending the message including the content via a network to a second messaging device, and obfuscating the marked content and displaying any remaining portions of the message on the second messaging device.

According to an exemplary embodiment of the present invention, an apparatus for obfuscation during collaborative communications, comprises a memory, and a processor coupled to the memory and configured to execute code stored in the memory for entering a message including content into a first messaging device, marking the content as sensitive, sending the message including the content via a network to a second messaging device, and obfuscating the marked content and displaying any remaining portions of the message on the second messaging device.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 4 is a high-level diagram of a system for temporary obfuscation during collaborative communications according to an exemplary embodiment of the invention.

FIG. 5 illustrates a computer system in accordance with which one or more components/steps of the techniques of the invention may be implemented, according to an exemplary embodiment of the invention.

DETAILED DESCRIPTION OF EXEMPLARY EMBODIMENTS

Exemplary embodiments of the invention will now be discussed in further detail with regard to systems and methods for obfuscation during communications and, in particular, to systems and methods for temporary obfuscation during collaborative communications. This invention may, however, be embodied in many different forms and should not be construed as limited to the embodiments set forth herein.

Figure 1:
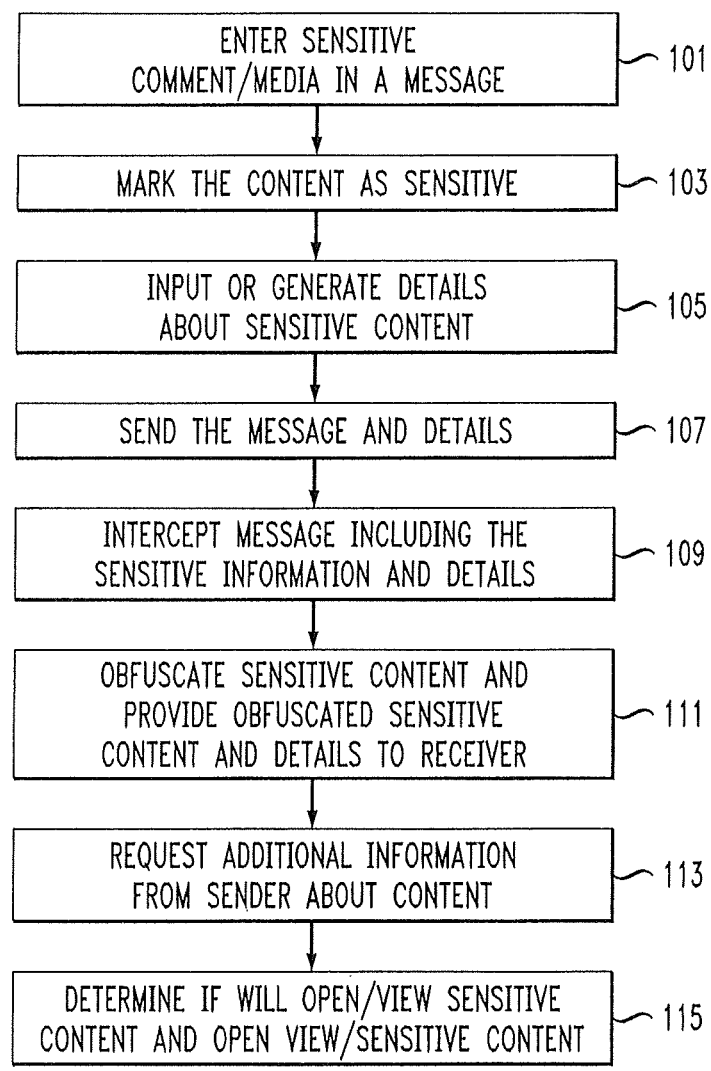
FIG. 1 is a flow diagram of a method for temporary obfuscation during collaborative communications implemented on a sender side according to an exemplary embodiment of the invention.

Disclosed are systems and methods for obfuscating sensitive material temporarily until unlocked by the receiver. Referring to FIG. 1, a method for temporary obfuscation during collaborative communications implemented on a sender side, according to an embodiment of the present invention is shown. At block 101, the sender enters a comment or media in a collaborative communication that could be sensitive. At block 103, the content is marked as sensitive. According to embodiments of the present invention, content may be marked as sensitive by, for example, highlighting the content, highlighting the content and performing a mouse operation, such as a right click, allowing a sender to click on "sensitive" as an option, highlighting the content and clicking on a menu option from a toolbar to mark the content as sensitive, and/or tagging all or part of the comment or media with meta data. According to an embodiment, as an alternative, or in addition to marking the sensitive content by highlighting the sensitive content, the sender could choose a flag, such as, for example, an all or nothing flag, which, for example, marks all graphics sent, and/or marks all messages including certain meta data, keywords or phrases (e.g., "confidential") as potentially sensitive. In addition, content may be deemed sensitive based on certain predetermined preference rules such as time of day the message is being sent. According to an embodiment, when content is marked as sensitive on the sender side, the content remains visible on the sender side, and will be obfuscated on the receiver side. However, it should be noted that embodiments of the present invention also allow the marked content to be obfuscated on the sender side, if, for example, criteria (e.g., preference rules) for obfuscating the content is met on the sender side. For example, a sender can send some content that certain individuals should not see. The content may also be obfuscated on the sender side if, for example, those individuals enter into the proximity of the sender's device, the device detects that others are around the device, and then obfuscates the content from the sender's device.

At block 105, the sender optionally provides details, which will be transmitted to the recipient, as to why, where and/or when the content is sensitive. According to embodiments of the present invention, such details may include, for example, the nature of the message, for who the message might be sensitive (e.g., customers, etc.), a time period when the content is sensitive (e.g., from 8 am-5 pm not sensitive, from 5 pm on, it could be sensitive, location where allowed (e.g., Bob cannot view the message while at the customer headquarters and/or in a public place). According to an embodiment, some of the details may be automatically generated, if, for example, the sensitivity is based on the use of certain keywords or key phrases, or based on predetermined preference rules for which a pre-formatted details message can be used. At block 107, the message including the sensitive content and details is sent via a network, at block 109, the receiver's system intercepts the message including the sensitive information and details, and at block 111, the receiver's system obfuscates the sensitive content and provides the additional information (if any provided) to the user. In accordance with an embodiment, the receiver's system may provide the receiver with a specialized notification that the message includes sensitive content. The specialized notification may be, for example, in the form of a sound byte. According to an embodiment, at block 113, the receiver can request additional information about the content if the receiver determines that there was not enough information provided. At block 115, the receiver determines if he/she wishes to open/view the sensitive information, and opens/views the sensitive information. According to an embodiment, opening/viewing the sensitive information can be performed by, for example, a right-click mouse operation. According to embodiments of the present invention, an obfuscated message or image can be, for example, hidden from view, grayed out, blacked out with an icon specifying that the content is locked, mosaicked or otherwise garbled to hide the content but still be present to tell the user that the content is there.

An example of a sender side implementation may be a situation where sender sends an instant message to receiver. Sender knows that receiver is on assignment at a customer and therefore confidential material sender is sending should not be viewed in front of any of the customers. Sender, therefore, marks the content as sensitive and sends an instant message. Receiver receives the message and the sensitive information is obfuscated on the receiver side until the receiver performs the necessary actions (e.g., a right-click mouse operation) to reveal the sensitive information.

Figure 2:
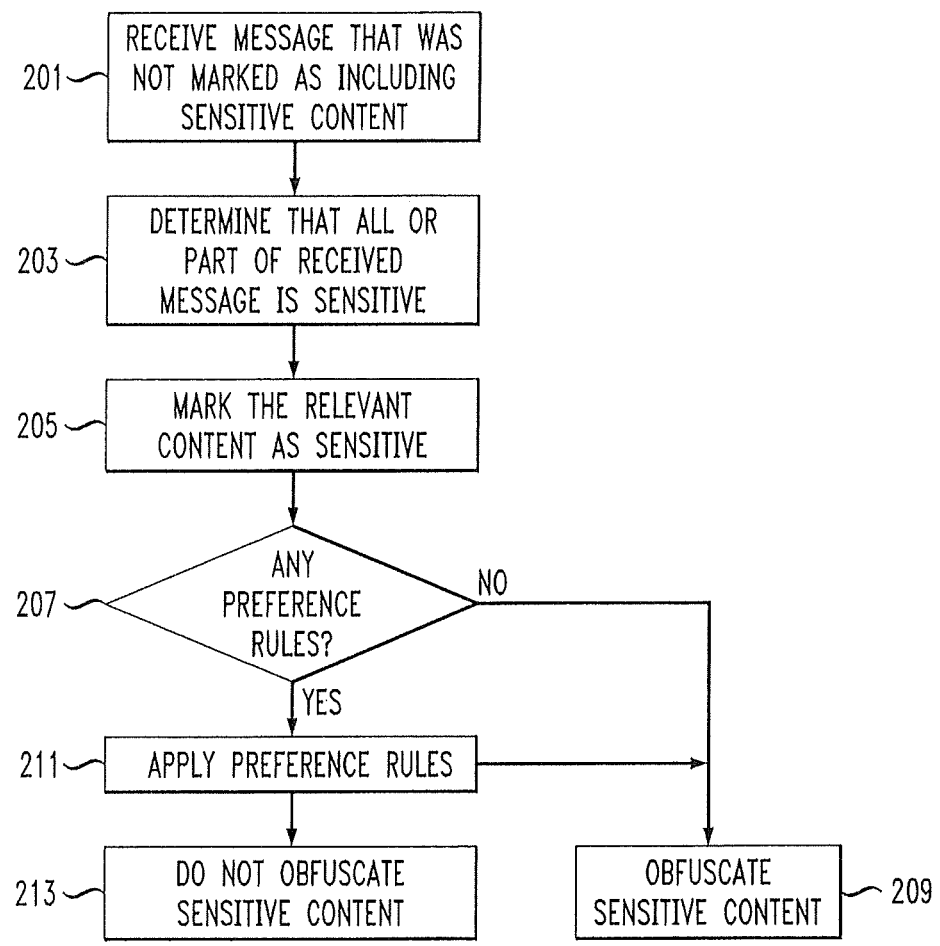
FIG. 2 is a flow diagram of a method for temporary obfuscation during collaborative communications implemented on a receiver side according to an exemplary embodiment of the invention.

Referring to FIG. 2, a method for temporary obfuscation during collaborative communications implemented on a receiver side, according to an embodiment of the present invention is shown. At block 201, a receiver receives a message that was not marked as including sensitive content (e.g., did not use implementations as set forth in FIG. 1). At block 203, the receiver makes a determination that all or part of the message is sensitive. At block 205, the receiver marks the message or part of the message as sensitive using the same or similar techniques to those described in connection with block 103 in FIG. 1, such as highlighting the content and/or tagging all or part of the content with meta data. According to an embodiment, as an alternative or in addition to a receiver making a determination as to whether the content or message is sensitive and a receiver marking the sensitive content, the receiver could choose an all or nothing flag, which, for example, marks all graphics received, and/or marks all messages including certain meta data, keywords or phrases (e.g., "confidential") as potentially sensitive. At block 207, it is queried whether there are any preference rules. If the answer is no at block at 207, the marked content is obfuscated at block 209. As described above, obfuscated could mean, for example, hidden from view, grayed out, blacked out with an icon specifying that the content is locked, and/or mosaicked or otherwise garbled. According to an embodiment, the mode of obfuscation can be set up by a user prior to receiving messages. In the receiver side implementation case, according to an embodiment, the content deemed sensitive by the receiver will be obfuscated on the receiver side, but not on the sender side.

According to an embodiment, prior to obfuscation, the system may perform a check to determine whether any preference rules have been implemented (as per block 207), which may put conditions on whether content is obfuscated. For example, preference rules may be based on location, time, and/or proximity of other people. Example preference rules include, for example, obfuscate messages while at home, but not in the office, obfuscate the messages after 5 pm, only show the messages if no other people are in the proximity, and keep the message obfuscated until a receiver unlocks it. According to an embodiment, the preference rules can be set up by a user prior to receiving messages. It the answer is yes at block 207, the system applies the preference rules at block 211 which may result in obfuscation at block 209, or no obfuscation at block 213.

In connection with a preference rule based on proximity of other people, the devices on which the messages are received, processed and/or displayed can include hardware and/or software to detect multiple devices in the area using, for example, BLUETOOTH type technology, in turn, inferring that there are multiple people in the area, or to detect multiple people in the proximity with biometric sensors, such as eye detectors, cameras, voice detectors, such as microphones, heat sensors, or other sensors that can detect human presence. Also, preference rules based on location may be tied in with information on location provided by global positioning systems, Wi-Fi and/or Wi-Fi type connections. According to embodiments of the present invention, preference rules are applied whether looking at a message in real time, or reviewing the history of a message that occurred in the past. For example, if a user is reviewing a message that occurred in the past during times or at a location where preference rules state that the sensitive content be obfuscated, the sensitive content from the past message is obfuscated according to those preference rules.

Figure 3A:
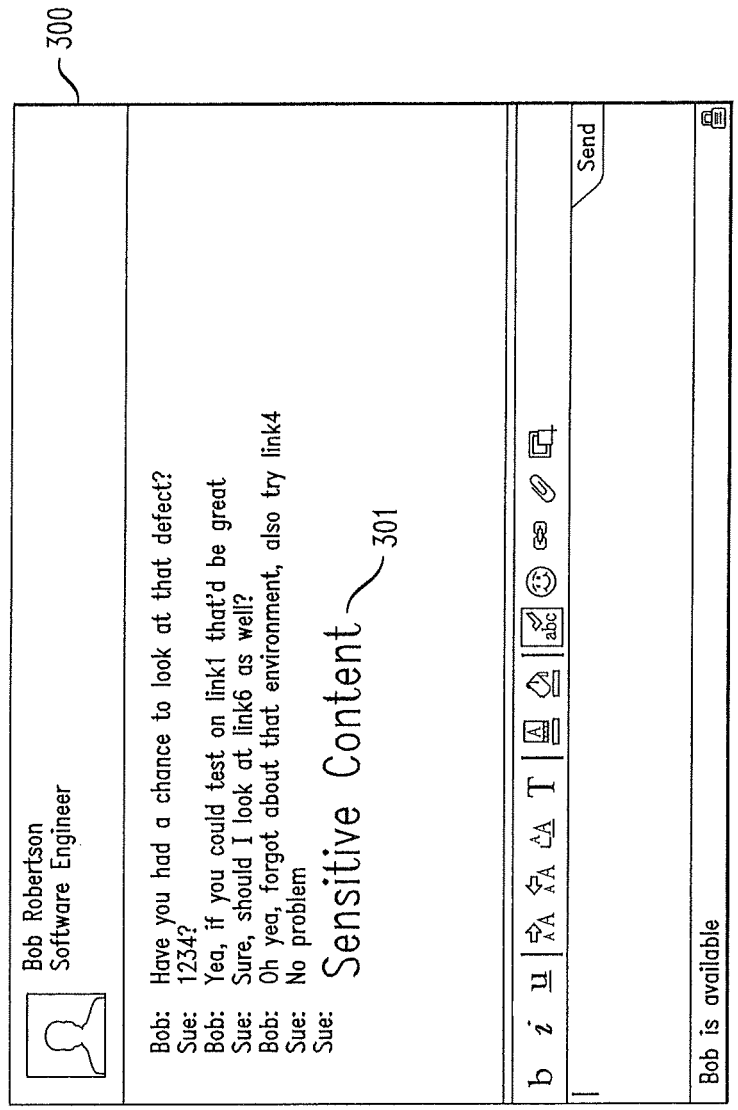
FIGS. 3A-3C are screen shots for illustrating implementation of an embodiment of the present invention.
Figure 3B:
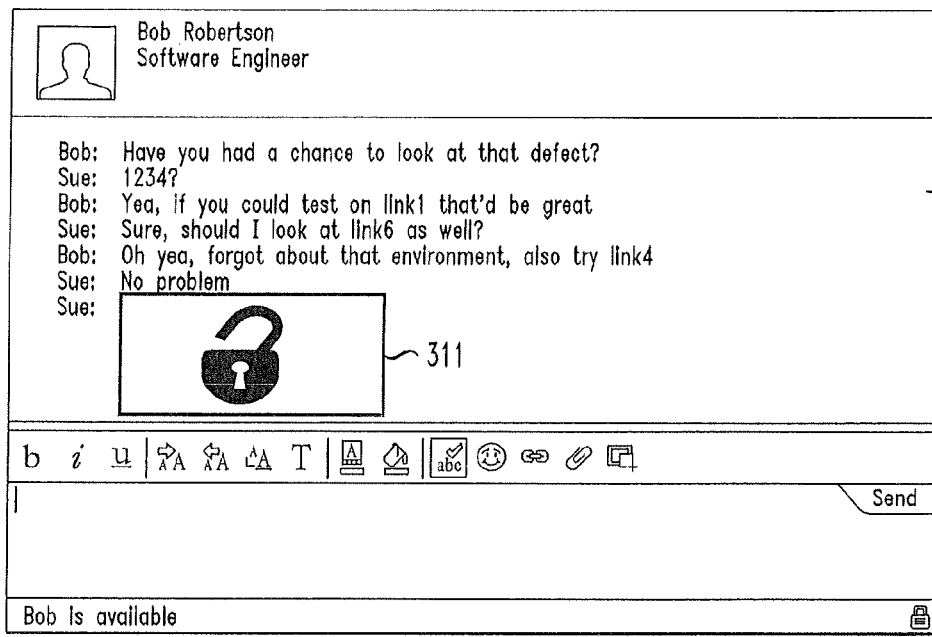
Figure 3C:
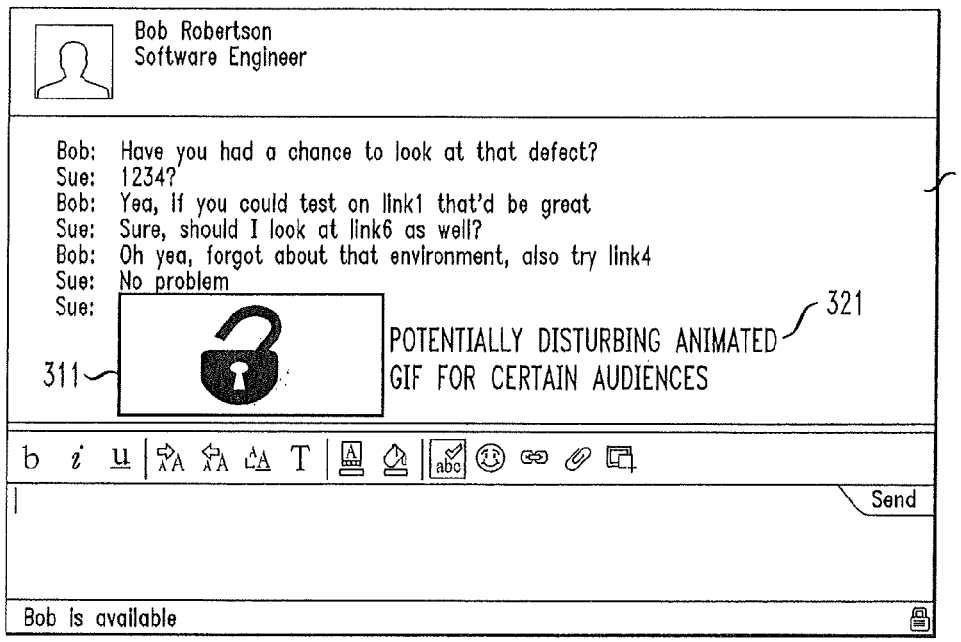

Referring, for example, to FIGS. 3A-3C, which are screen shots for illustrating implementation of an embodiment of the present invention, a sample collaborative messaging scenario is shown between two individuals (e.g., "Bob" and "Sue"). Referring to FIG. 3A, the first screen shot 300 shows potentially sensitive content 301 coming from Sue. The potentially sensitive content can include, but is not necessarily limited to, an animated gif, still images, words or phrases, confidential information, etc. In this example, we will assume that the sensitive content 301 is an animated gif, Bob is in a public place with many people nearby and does not want people passing by to see this type of graphic. According to embodiments of the present invention, Bob or Sue can mark the graphic as potentially sensitive. Once marked, Bob may see an image 311 such as what is shown in screen shot 310 in FIG. 3B. According to an embodiment, referring to the screen shot 320 in FIG. 3C, Bob can move his cursor or pointer over the image 311 to reveal further information 321 about the sensitive content and learn more about why this content is obfuscated. In addition, by, for example, clicking his mouse on the image 311, Bob can unlock the potentially sensitive gif once he is no longer in the public place and/or no other people are in the area. Sue's version of the conversation shows the sensitive content. However, as described, above, embodiments of the present invention also allow the marked content to be obfuscated on Sue's side, if, for example, criteria (e.g., preference rules) for obfuscating the content is met on Sue's side.

Referring to FIG. 4, which is a high-level diagram of a system for temporary obfuscation during collaborative communications according to an exemplary embodiment of the invention, a system 400 includes messaging devices 401 and 421 for users A and B, respectively. The messaging devices 401, 421 can be, for example, desktop computers, laptops, mobile phones, such as smartphones, personal digital assistants (PDAs), or any other device capable of receiving and sending collaborative messages, such as instant messages or text and multimedia messages sent using SMS and/or MMS. Depending on the situation, users A and B can be either senders or receivers of messages, or both. For purposes of discussion and explanation, user A will be referred to as the sender, and user B as the receiver, but are not limited thereto. The messaging devices are connected to each other via a network 450, which can include but is not limited to, for example, a local area network (LAN), wide area network (WAN), cellular network, satellite network and the Internet.

Each messaging device 401 and 421 is equipped with the same or similar modules for performing the processes associated with the embodiments of the present invention. For example, each messaging device includes one or more input devices 403, 423, which interface with a user interface 405, 425, such as a graphical user interface (GUI). The input devices 403, 423 include, for example, virtual and/or physical keyboards, mice, touchscreens, and/or voice input devices. Each device 401, 421 further includes a content module 407, 427, a message analyzer module 409, 429, a preference rule module 411, 431, a detection module 413, 433 and one or more sensors 415, 435.

According to an embodiment, the sender (e.g., user A) enters a comment or media via input device 403 and user interface 405 that could be sensitive. Using the input device 403, user A is able to instruct the system to mark the content as sensitive by, for example, highlighting the content and selecting a menu option to mark the content as sensitive. User A's selection of sensitive content is transmitted to content module 407. According to an embodiment, as an alternative, or in addition to the user instructing the system to mark the sensitive content, the message analyzer module 409 connected to the content module 407 analyzes the message to determine the presence of any graphics and/or meta data, keywords or phrases. If the message analyzer module 409 finds any graphics, meta data, keywords or key phrases, the message analyzer module 409 communicates this result to the content module 407 to apply, for example, an all or nothing flag, which marks all graphics, and/or marks all messages or parts of a message including certain meta data, keywords or phrases as potentially sensitive. In addition, depending on certain pre-defined settings, the content module 407 can receive input from the preference rules module 411 that instructs that the message or parts of the message be deemed sensitive based on certain predetermined preference rules such as, for example, the time of day the message is being sent. According to an embodiment, the content module 407, based on input from the user, the message analyzer module 409 and/or the preference rule module 411, marks content in the message as sensitive on user A's side. The content remains visible on user A's side, and will be obfuscated on user B's side. However, as described above, embodiments of the present invention allow the marked content to also be obfuscated on user A's side, if, for example, criteria (e.g., preference rules) for obfuscating the content is met on user A's side.

User A can provide details via the input device 403, which will be transmitted to user B, as to why, where and/or when the content is sensitive. According to embodiments of the present invention, as described above, such details may include, for example, the nature of the message, for who the message might be sensitive, a time period when the content is sensitive, and/or location where message viewing is allowed.

As stated above, according to an embodiment, some of the details may be automatically generated by the content, message analyzer and/or preference rules modules 407, 409, 411, if, for example, the sensitivity is based on the use of certain keywords or key phrases, or based on predetermined preference rules for which a pre-formatted details message can be used. The marked message and explanations, if any, are sent to user B's device 421 via the network 450. The device 421 receives the marked message and explanations at the content module 427, which can obfuscate the sensitive content, alert user B of the sensitivity of the content, and provide the additional information (if any provided) to user B via the user interface 425. According to an embodiment, user B can request additional information from user A about the content via the user interface 425 if user B determines that there was not enough information provided about the sensitivity. If user B determines that he/she wishes to open/view the sensitive information, user B opens/views the sensitive information via user interface 425 and input device 423.

If user B receives a message that was not marked as sensitive, user B can make a determination that all or part of the message is sensitive, and instruct the system to mark the message or part of the message as sensitive using the same or similar techniques to those described in connection with user A instructing the system to mark a message. Also, as an alternative or in addition to user B instructing the system to mark the sensitive content, the message analyzer module 429 connected to the content module 427 analyzes the message to determine the presence of any graphics and/or meta data, keywords or phrases. If the message analyzer module 429 finds any graphics, meta data, keywords or key phrases, the message analyzer module 429 communicates this result to the content module 427 to apply, for example, an all or nothing flag, which marks all graphics, and/or marks all messages or parts of a message including certain meta data, keywords or phrases as potentially sensitive. The marked content can be obfuscated by the content module 427. According to an embodiment, the mode of obfuscation can be set up by user B prior to receiving messages.

According to an embodiment, prior to obfuscation, the preference rule module 431 can perform a check to determine whether any preference rules have been implemented, which may put conditions on whether content is obfuscated. For example, as described above, preference rules may be based on location, time, and/or proximity of other people. As described above, example preference rules include, for example, obfuscate messages while at home, but not in the office, obfuscate the messages after 5 pm, only show the messages if no other people are in the proximity, and keep the message obfuscated until a receiver unlocks it. According to an embodiment, the preference rules can be set up by user B prior to receiving messages.

In connection with a preference rules based on proximity of other people and/or location, the devices 401, 421 on which the messages are received, processed and/or displayed include a detection module 413, 433 to detect location, multiple devices and/or multiple people in an area using, for example, sensors 415, 435. The sensors 415, 435 can include BLUETOOTH type technology sensors or receivers detecting multiple user devices in the area to infer multiple people in an area, biometric sensors, such as eye detectors, cameras, voice detectors, such as microphones, heat sensors, or other sensors that can detect human presence, and GPS, Wi-Fi or Wi-Fi type devices which can determine location based on a GPS signal, Wi-Fi or Wi-Fi type connection. As stated above, according to embodiments of the present invention, preference rules are applied whether looking at a message in real time, or reviewing the history of a message that occurred in the past.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1, 2, 3A, 3B, 3C and 4 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for obfuscation during collaborative communications, comprising:
a first messaging device and a second messaging device connected to each other via a network, wherein the first and second messaging devices each include:
at least one processor coupled to a memory;
a user interface and an input device through which a user of the messaging device is able to instruct the system to mark content of a message as sensitive;
a content module for marking the content of the message as sensitive, and obfuscating the marked content, wherein the marked content is obfuscated on the messaging device which receives the message;
a message analyzer module connected to the content module, wherein the message analyzer module analyzes the marked content;
a preference rules module for outputting to the content module one or more predetermined preference rules that instruct that the message or a part of the message be marked as sensitive, wherein the predetermined preference rules are based on at least one of location, time, or people in proximity to the messaging devices; and
a detection module for determining at least one of a presence of a device in proximity to, a presence of a person in proximity to, or a location of each of the first and second messaging devices;
wherein the content module automatically generates details about the marked content based on the analysis;
wherein the automatically generated details are transmitted via the network to a user of the messaging device which receives the message;
wherein analyzing the marked content comprises analyzing use of at least one of keywords and key phrases in the marked content, wherein the automatically generated details are based on at least one of the keywords and key phrases;
wherein the collaborative communications comprise at least one of instant messaging, messages sent via short message service (SMS) and messages sent via multimedia messaging service (MMS); and wherein the content, message analyzer, preference rules and detection modules are executed on the at least one processor.

2. The system of claim 1, wherein the message analyzer module analyzes the message to determine the presence of at least one of a graphic, meta data, a keyword or a key phrase.

3. The system of claim 2, wherein if the message analyzer module finds at least one of the graphic, meta data, keyword or key phrase, the message analyzer module outputs the finding to the content module, wherein the content module applies a flag to mark a part of the message corresponding to the at least one of the graphic, meta data, keyword or key phrase as sensitive.

4. The system of claim 1, wherein the content module marks as sensitive and obfuscates the message or the part of the message based on the predetermined preference rules.

5. The system of claim 1, wherein, prior to obfuscation of the marked content on the messaging device which receives the message, the preference rule module performs a check to determine whether any preference rules have been implemented which may put conditions on whether the marked content is obfuscated.

6. The system of claim 1, wherein a user of the messaging device from which the message is sent provides further details about the marked content via the input device, and wherein the further details are transmitted via the network to a user of the messaging device which receives the message.

7. The system of claim 1, wherein the marked content remains visible on the messaging device from which the message is sent.

8. The system of claim 1, wherein the marked content is obfuscated on the messaging device from which the message is sent.

9. An article of manufacture comprising a non-transitory computer readable storage medium comprising program code tangibly embodied thereon, which when executed by a computer, performs method steps for obfuscation during collaborative communications, the method steps comprising:

entering a message including content into a first messaging device;

marking the content as sensitive;

analyzing the marked content;

automatically generating details about the marked content based on the analysis;

sending the message including the marked content and the automatically generated details about the marked content via a network to a second messaging device;

applying one or more predetermined preference rules that instruct that the message or a part of the message be marked as sensitive, wherein the predetermined preference rules are based on at least one of location, time, or people in proximity to the second messaging device; and determining at least one of a presence of a device in proximity to, a presence of a person in proximity to, or a location of the second messaging device; and obfuscating the marked content and displaying any remaining portions of the message on the second messaging device;

wherein analyzing the marked content comprises analyzing use of at least one of keywords and key phrases in the marked content, wherein the automatically generated details are based on at least one of the keywords and key phrases; and wherein the collaborative communications comprise at least one of instant messaging, messages sent via short message service (SMS) and messages sent via multimedia messaging service (MMS).

10. An apparatus for obfuscation during collaborative communications, comprising:

a memory; and a processor coupled to the memory and configured to execute code stored in the memory for:

entering a message including content into a first messaging device;

marking the content as sensitive;

analyzing the marked content;

automatically generating details about the marked content based on the analysis;

sending the message including the marked content and the automatically generated details about the marked content via a network to a second messaging device;

applying one or more predetermined preference rules that instruct that the message or a part of the message be marked as sensitive, wherein the predetermined preference rules are based on at least one of location, time, or people in proximity to the second messaging device; and determining at least one of a presence of a device in proximity to, a presence of a person in proximity to, or a location of the second messaging device; and obfuscating the marked content and displaying any remaining portions of the message on the second messaging device;

wherein analyzing the marked content comprises analyzing use of at least one of keywords and key phrases in the marked content, wherein the automatically generated details are based on at least one of the keywords and key phrases; and wherein the collaborative communications comprise at least one of instant messaging, messages sent via short message service (SMS) and messages sent via multimedia messaging service (MMS).

11. The article of manufacture of claim 9, wherein analyzing the marked content is performed in conjunction with the one or more predetermined preference rules, and the automatically generated details are based on the one or more predetermined preference rules.

* * * * *